United States Patent [19]

Nguyen

[11] Patent Number: 4,703,068
[45] Date of Patent: Oct. 27, 1987

[54] METHOD FOR MAKING A DICYCLOPENTADIENE CROSS-LINKED POLYMER AND THE PRODUCT THEREOF

[75] Inventor: Tuyen T. Nguyen, Newark, Del.

[73] Assignee: Hercules Incorporated, Wilmington, Del.

[21] Appl. No.: 723,022

[22] Filed: Apr. 15, 1985

Related U.S. Application Data

[63] Continuation-in-part of Ser. No. 554,467, Nov. 22, 1983, abandoned.

[51] Int. Cl.$^4$ .............................. C08F 2/02; C08F 4/68; C08F 36/00
[52] U.S. Cl. ................................. 521/150; 521/142; 526/142; 526/143; 526/169; 526/280; 526/281; 526/283; 525/247
[58] Field of Search ................. 521/150, 142; 526/169

[56] References Cited

U.S. PATENT DOCUMENTS

| | | | |
|---|---|---|---|
| 3,684,781 | 8/1972 | Nutzel et al. | 526/169 |
| 3,817,964 | 6/1974 | Schon et al. | 526/169 |
| 4,400,340 | 8/1983 | Klosierwiez | 526/169 |
| 4,436,858 | 3/1984 | Klosierwiez | 526/169 |
| 4,604,408 | 8/1986 | Newburg | 526/169 |

FOREIGN PATENT DOCUMENTS 2343093  2/1975  Fed. Rep. of Germany ...... 526/169

OTHER PUBLICATIONS

Tadmor et al, Principles of Polymer Processing, (1979), pp. 601–611.

*Primary Examiner*—Edward J. Smith
*Attorney, Agent, or Firm*—Dale R. Lovercheck

[57] ABSTRACT

Disclosed is a method of making a cross-linked poly(-dicyclopentadiene) with a metathesis-catalyst system, where the metathesis-catalyst system contains an organoaluminum or organoaluminum halide activator and a pentavalent tantalum catalyst. In a preferred embodiment, the cross-linked polymer is formed by combining, in a first place, a plurality of reactant streams, one reactant stream which contains the activator, a second reactant stream which contains the catalyst and at least one reactant stream which contains dicyclopentadiene; then injecting the combined reactant streams into a second place, such as a mold, where polymerization occurs. Use of the pentavalent tantalum catalyst results in the formation of a cross-linked polymer having less color and greater transparency than cross-linked poly(dicyclopentadiene) made without a pentavalent tantalum catalyst.

21 Claims, No Drawings

METHOD FOR MAKING A DICYCLOPENTADIENE CROSS-LINKED POLYMER AND THE PRODUCT THEREOF

BACKGROUND OF THE INVENTION

This invention relates to the chemical arts. In particular it relates to a method for the preparation of a cross-linked polymer of dicyclopentadiene (hereinafter referred to as DCPD) with a metathesis-catalyst system.

Cross-linked poly(DCPD) is well suited for a wide variety of applications, particularly as an engineering plastic or foam. The number of applications has been somewhat limited, however, because of the dark color and cloudy appearance of the polymer. Consequently, there is a desire to produce cross-linked poly(DCPD) which has a light color and good transparency.

One of the great advantages offered by poly(DCPD) is that the catalysis of DCPD monomer can be controlled so that a reaction mixture can be formed in one place and then the reaction mixture injected to a second place where polymerization occurs. A prime example of how this advantage is put to use is reaction injection molding (sometimes hereinafter referred to as RIM). Reaction injection molding is a process for inmold polymerization which involves the mixing of two or more low viscosity reactant streams in a mixing head. The combined streams are then injected into a mold where they quickly react to form a solid infusible mass. For a particular catalyst system to be of use with RIM and related processes, certain requirements must be met:

(1) the individual reactant streams must be stable and must have a reasonable shelf-life under ambient conditions;

(2) it must be possible to combine the reactant streams without their reacting in the mixing head;

(3) when injected into the mold, the materials must react rapidly to form a solid; and (4) any additives incorporated into the catalyst system must not interfere with the above requirements. Where a cellular cross-linked polymer is the desired product an additional requirement must be met:

(5) the reactant streams must set up into a cellular cross-linked structure.

It can be seen that in RIM or related processes the catalyst is critical. For a process to be of use in commercial situations the polymerization should occur quickly, but the polymerization cannot occur so quickly that the cross-linked polymer is formed before the combined reactant streams can be injected into the mold. Moreover, in those situations where a cross-linked polymeric foam is desired, the foaming (the formation of bubbles and their subsequent expansion) must occur before the combined reactant streams begin to cross-link to any significant degree, but the foaming must occur after the combined reactant streams have developed a viscosity sufficient to support a foamed structure.

It is known in the prior art to base a metathesis-catalyst system useful in polymerization of cycloolefins on a pentavalent tantalum catalyst and an organoaluminum or organoaluminum halide activator. For example, U.S. Pat. No. 3,492,278 discloses the preparation of an essentially gel free elastomer from cyclopentadiene using, inter alia, tantalum pentahalide. U.S. Pat. No. 3,707,520 discloses the preparation of linear elastomers from cyclopentadiene and up to 20% by weight of a diolefin, including dicyclopentadiene, using, inter alia, tantalum pentachloride and organoaluminum or organoaluminum halide activator.

U.S. Pat. No. 4,400,340 discloses the use of a metathesiscatalyst; preferably a tungsten containing metathesis-catalyst; an organoaluminum or organoaluminum halide activator; and a rate moderator and the use of a RIM process to form a cross-linked poly(DCPD).

In accordance with the invention a method is provided for preparing a cross-linked polymer having light color and good transparency comprising polymerized units of DCPD employing a metathesis-catalyst system which does not require a rate modifier.

BRIEF DESCRIPTION OF THE PREFERRED EMBODIMENTS

A cross-linked polymer comprised of polymerized units of DCPD monomer having light color and good transparency is made with a metathesis-catalyst system, where the metathesis-catalyst system contains a pentavalent tantalum catalyst and an organoaluminum or organaluminum halide activator. In a preferred embodiment, the cross-linked polymer is made by combining in a first place, a plurality of reactant streams to form a reaction mixture, one reactant stream containing the activator, a second reactant stream containing the catalyst and at least one reactant stream containing the monomer; then injecting the reaction mixture into a second place, such as a mold, where the cross-linked polymer is formed.

DETAILED DESCRIPTION OF THE INVENTION

A metathesis-catalyst system which incorporates an organoaluminum or organoaluminum halide activator and a pentavalent tantalum catalyst is employed to polymerize DCPD monomer in such a manner that the resulting product is a cross-linked polymer.

In the preferred embodiment, the cross-linked polymer is formed entirely from dicyclopentadiene monomer. In other embodiments, the cross-linked polymer is formed from DCPD monomer and from up to about 20%, based on the weight of DCPD, of another cycloolefin monomer where the cycloolefin monomer contains from about five to about twelve carbon atoms. Representative cycloolefin monomers include norbornene, norbornadiene, cyclopentene, dimethanehexahydronaphthalene and dimethaneoctahydronaphthalene.

The polymerization of the monomer is catalyzed by a metathesis-catalyst system. One part of the system is a pentavalent tantalum catalyst. The pentavalent tantalum catalyst may be represented by the formula $Ta-Y_5$, where Y represents a radical selected from the group of halides, preferably chlorides; alkoxys, represented by the formula —O—R, where the organic radical R is a hydrocarbyl containing from 1 to 10 carbon atoms; aryloxyls, represented by the formula —O—Ar, where the organic radical Ar is an aromatic radical containing from 1 to 3 aromatic rings; and carboxys, represented by the formula —OOCR', where the organic radical R' is a hydrocarbyl containing from 1 to 10 carbon atoms. The preferred pentavalent tantalum catalyst is $TaCl_5$.

The other part of the metathesis-catalyst system is an organoaluminum or organoaluminum halide activator or mixtures thereof. Representative activators include trialkylaluminum, alkylaluminum dihalide and dialkylaluminum halide where the alkyl contains one to ten carbon atoms. In the preferred activators the alkyl is ethyl and the halide is chloride. The most preferred activator is diethylamuminum chloride.

The pentavalent tantalum catalyst, as described above, is preferably in solution with the monomer or mixture of monomers to be polymerized. In a preferred embodiment, the pentavalent tantalum catalyst is first added to a small amount of a solvent to form a slurry. The solvent must not be susceptible to reaction with pentavalent tantalum catalyst. Examples of preferred solvents are benzene, xylene, toluene, chlorobenzene, dichlorobenzene, trichlorobenzene and hexane. Sufficient solvent is added so that the pentavalent tantalum catalyst concentration is between about 0.1 and 0.7 mole per liter of solvent. The pentavalent tantalum catalyst is then made soluble in the slurry by the addition to the slurry of a small amount of a solubilizer. Representative solubilizers include alcohols, phenols, perflouro acid anhydride and mixtures thereof. Alcohols or phenols are preferred. Suitable phenols include phenol, alkyl-phenols, and halogen containing phenols, with tert-butyl phenol, tert-octyl phenol and nonyl phenol being most preferred. Suitable alcohols include methanol, ethanol and decylalcohol. The preferred molar ratio of pentavalent tantalum catalyst to solublizer is from about 1:1 to about 1:3. The pentavalent tantalum catalyst-solublizer solution can be made by adding the solublizer to the pentavalent tantalum catalyst slurry, stirring the resulting solution and then blowing a stream of a dry inert gas through the solution to remove any gases which may be formed. Alternatively, a salt, such as a lithium or sodium phenoxide, can be added to the pentavalent tantalum catalyst slurry, the mixture stirred until essentially all the pentavalent tantalum catalyst is dissolved, and the precipitated inorganic salt removed by filtration or centrifugation. All of these steps should be carried out in the absence of moisture and air to prevent deactivation of the catalyst.

In some embodiments of the invention, it is desirable to increase the shelf-life of the catalyst solution. This is done by adding from about 1 to about 5 moles of a complexing agent such as a Lewis base or a chelant per mole of pentavalent tantalum catalyst to the pentavalent tantalum catalyst solution. Preferred Lewis bases include nitriles and ethers, such as, benzonitrile and tetrahydrofuran. Preferred chelants include acetylacetones and alkyl acetoacetates, where the alkyl group contains from one to ten carbon atoms. From about one to about five moles of complexing agent are added per mole of pentavalent tantalum catalyst in the solution. The improvement in the shelf-life of the pentavalent tantalum catalyst/monomer solution is obtained whether the complexing agent is added before or after the solubilizer is added.

The activator, as described above, is also preferably in solution with the monomer or mixture of monomers to be polymerized. It has been found that, in general, where a pentavalent tantalum catalyst is used in RIM or related processes there is no need to incorporate a rate moderator into the catalyst system. Using the above described catalyst system it is possible to combine the reactant streams in one place without their reacting before they can be injected into a mold.

The components of the catalyst system of this invention are combined so that the resulting monomer to pentavalent tantalum catalyst ratio, on a molar basis, is from about 1,000:1 to about 10,000:1, 1, preferably about 2,000:1 and so that the resulting activator to a pentavalent tantalum catalyst ratio will be from about 2:1 to about 20:1, preferably about 10:1.

In those embodiments where a cross-linked polymeric foam is desired, a blowing agent is incorporated into the catalyst system. The blowing agent is incorporated into either or both parts of the metathesis-catalyst system, or it may be added to the monomer separately. The amount of blowing agent to be incorporated is from about 2 to about 30, preferably about 5 to about 20 percent by weight, based on the combined weight of the monomer and catalyst system.

Any of the conventional blowing agents used in RIM processes are employed provided that the blowing agent does not poison or otherwise adversely effect on the metathesis-catalyst system. Preferred blowing agents include low boiling organic compounds, i.e. compounds which are liquids under ambient conditions but which are volatilized under the conditions at which polymerization occurs. Representative low boiling organic compounds include hydrocarbons such as pentane, and hexane; halogenated hydrocarbons such as methylene chloride and trichlorofluoromethane. Representative inert gases, which are added under pressure to the catalyst system, include nitrogen, argon and halogenated hydrocarbons such as dichlorodifluoromethane.

The exact amounts of catalyst, activator and when desired, blowing agent, to be incorporated into a given catalyst sytem will depend on the particular catalyst, activator, blowing agent and other additives chosen as well as the desired final product. The amounts will be readily determinable by one skilled in the art without undue experimentation following the teachings of this specification.

In some embodiments, the cross-linked polymer is made and molded with a RIM or related process. The two parts of the metathesis-catalyst system are separately mixed with monomer, to form two stable solutions which are placed in separate vessels. These vessels provide the source for separate streams. The two streams are combined in one place, as for example, a RIM machine's mixing head, and then injected into a mold where polymerization takes place.

The time for polymerization is temperature dependent. As the temperature of the mold is increased, the rate of formation of cross-linked polymer is also increased. At 25° C. it typically takes on the order of 20 minutes for the polymer to be formed. If the temperature of the mold is increased to 40° C., the polymer is typically formed in about 5 minutes, and if the temperature of the mold is further increased to 60° C., the polymer is typically formed in less than about 2 minutes.

The invention is not intended to be limited to embodiments employing two streams each containing monomer. It will be obvious to one skilled in the art that there may be situations where it is desirable to have monomer incorporated in just one stream or to employ a plurality of streams where the additional streams contain monomer or additives or both.

In a RIM process the streams are combined in the mixing head of a RIM machine. Typically the mixing heads have orifices about 0.032 inch in diameter and a jet velocity of about 400 ft/sec. After being combined, the mixture is injected into mold maintained from about 35° to about 100° C., preferably from about 50° to about 70° C. The mold pressure is in the range of about 10 to about 15 psi. An exothermic reaction occurs as the polymerization occurs.

The pentavalent tantalum catalyst has the effect of imparting a light color and good transparency to the resulting cross-linked polymer.

Table 1 shows the results of measurements of haze and luminous transmittance, expressed as tristimulus values, measured in accordance with ASTM method D1003. Haze is the percentage of diffusely transmitted light and is measured as the ratio of diffuse transmittance to total transmittance (diffuse plus specular light). Luminous transmittance is the ratio of transmitted to incident light. In these measurements, luminant C and 2° standard observer are used.

As shown in Table 1, the percent haze of product of Example 1 herein is unexpectedly lower than the percent haze of the product of Klosiewicz U.S. Pat. No. 4,400,340, Example 1. In addition, Table 1 shows the products of Example 1 herein to have significantly higher luminous transmittance than the product of Example 1 of Klosiewicz.

TABLE 1

| Tristimulus Values and % Haze of Dicyclopentadiene Polymer Cross-linked | | | | |
|---|---|---|---|---|
| | Luminous Transmittance | | | |
| Material from | X | Y | Z | % Haze |
| Klosiewicz | 6.39 | 3.78 | 0.04 | 63.21 |
| Example 1 (below) | 73.95 | 78.16 | 30.58 | 4.84 |

Preferably the product has a percent haze of less than 25 percent. More preferably the percent haze is less than 20, 15, and 10 percent respectively. Most preferably the percent haze is less than 5 percent.

Preferably the product has a luminous transmittance of at least 20 for each of the tristimulus values. More preferably, the product has a luminous transmittance of at least 30 for each of the tristimulus values. Preferably the luminous transmittance of the product is 50 for at least one of the tristimulus values. More preferably, the luminous transmittance is at least 70 for at least one of the tristimulus values. Most preferably, the luminous transmittance is at least 70 for at least two of the tristimulus values.

In some embodiments of this invention, a preformed elastomer which is soluble in the reactant streams is added to the metathesis-catalyst system in order to increase the impact strength of the polymer. The elastomer is dissolved in either or both of the reactant streams in an amount from about 3 to about 15 weight percent range, based on the weight of monomer. Illustrative elastomers include natural rubber, butyl rubber, polyisoprene, polybutadiene, polyisobutylene, ethylenepropylene copolymer, styrene-butadiene-styrene triblock rubber, random styrene-butadiene rubber, styrene-isoprene-styrene triblock rubber and ethylene-propylene-diene terpolymers. The amount of elastomer used is determined by its molecular weight and is limited by the viscosity of the resultant reactant streams. The resultant reactant streams containing elastomer cannot be so viscous that mixing is not possible. Although the elastomer can be dissolved in either one or both of the streams, it is desirable that it be dissolved in both.

In some embodiments, the reactant streams and consequently the final polymer may also contain other additives such as fillers. Representative fillers include glass wollastonite, mica, carbon black, talc, and calcium carbonate. In those embodiments where a cellular structure is desired, a nucleating agent, such as calcium carbonate may be added to at least one of the reactant streams. The nucleating agent effects the structure of the foam by helping to make the cells small and uniform. Other suitable nucleating agents include talc, magnesium carbonate, barium carbonate, zinc carbonate, lead carbonate, magnesium oxide, calcium oxide, barium oxide, zinc oxide, lead oxide, and silica. Silica is preferred.

The best mode now contemplated of carrying out this invention is exemplified by the following working examples of preferred specific embodiments. This invention is not limited to these specific examples.

Catalyst Preparation

EXAMPLE A

Example A illustrates a preferred embodiment of preparing a nonylphenol solubilized tantalum pentachloride catalyst.

0.45 g (1.3 mmol) $TaCl_5$ is added to an oven-dried polytube in a dry box. 0.23 g (1.3 mmol) nonylphenol in 13 ml chlorobenzene which has been sparged with argon for 1 hour is added to the polytube. The mixture is sparged for 1 hour to remove the HCl produced. Finally, chlorobenzene is added to the polytube to restore the original chlorobenzene level. This results in a 0.1 molar solubilized catalyst solution.

EXAMPLE B

Example B illustrates a preferred embodiment of preparing a trifluoroacetic acid anhydride solubilized tantalum pentachloride catalyst.

0.46 g (1.38 mmol) $TaCl_5$ is added to an oven-dried polytube in a dry box. 10 ml chlorobenzene is then added to the polytube to make a slurry. To this slurry is added 0.2 ml (1.4 mmol) trifluoroacetic acid anhydride. The $TaCl_5$ is dissolved and the solution is sparged with argon for 1 hour to remove trifluoroacetyl chloride produced. Sufficient chlorobenzene is then added to the polytube to restore the original chlorobenzene level. This results in a 0.13 molar solubilized catalyst solution.

EXAMPLE C

Example C illustrates a preferred embodiment of preparing an ethanol solubilized tantalum pentachloride catalyst.

0.55 g (1.5 mmol) is added to an oven-dried polytube in a dry box. 10 ml of chlorobenzene is then added to the polytube to make a slurry. 0.09 ml (1.5 mmol) ethanol is then added. The $TaCl_5$ is dissolved and the solution sparged with argon to remove HCl for 2 hours. This results in a 0.15 molar solubilized catalyst solution.

EXAMPLE D

Example D illustrates a preferred embodiment of preparing a methanol solubilized tantalum pentachloride catalyst.

0.96 g (2.7 mmol) $TaCl_5$ is added to an oven-dried polytube in a dry box. 10 ml of chlorobenzene is then added to make a slurry. To this slurry is added 0.54 ml (13.3 mmol) methanol. The $TaCl_5$ is dissolved and the solution is sparged with argon to remove HCl for 2 hours. Sufficient chlorobenzene is then added to the polytube to restore the original chlorobenzene level. This results in a 0.26 molar solubilized catalyst solution.

EXAMPLE E

Example E illustrates a preferred embodiment of preparing a methanol-ethanol solubilized tantalum pentachloride catalyst. lyst.

0.93 g (2.6 mmol) $TaCl_5$ is added to an oven-dried polytube in a dry box. 10 ml of toluene is then added to make a slurry. To this slurry is added 0.42 ml (10.4 mmol) methanol and the solution is sparged. After 1 hour, 0.15 ml (2.6 mmol) ethanol is added and the solution sparged an additional 2 hours with argon to remove HCl. Sufficient toluene is then added to the polytube to restore the original toluene level. This results in a 0.26 molar solubilized catalyst solution.

EXAMPLE F

Example F illustrates a preferred embodiment of preparing a methanol-decyl alcohol solubilized tantalum pentachloride catalyst.

3.6 g (10.2 mmol) $TaCl_5$ is added to an oven-dried pop bottle in a dry box. 50 ml toluene and then 1.96 ml (10.2 mmol) decyl alcohol are then added to produce a homogenous solution. The solution is stirred for 5 minutes and sparged with argon. Then 0.83 ml (20.4 mmol) methanol is added and the mixture sparged with argon for 2 hours to remove the HCl which is produced. Sufficient toluene is then added back to the pop bottle to produce a 0.21 molar solubilized catalyst solution.

EXAMPLE G

Example G illustrates a preferred embodiment of preparing a methanol-nonylphenol solubilized tantalum pentachloride catalyst.

3.5 g (10 mmol) $TaCl_5$ is added to an oven-dried pop bottle in a dry box. 50 ml toluene and 2 ml (10 mmol) nonylphenol are added. The solution is stirred and sparged with argon for 10 minutes. 0.82 ml (20.2 mmol) methanol is added and the mixture sparged with argon for 2 hours to remove the HCl which is produced. Sufficient toluene is then added back to the pop bottle to restore the original level. This results in a 0.2 molar solubilized catalyst solution.

Polymerization

EXAMPLES 1-7

Examples 1-7 illustrate preferred embodiments of preparing cross-linked poly(DCPD) using a tantalum pentachloride catalyst, prepared as described above, and a diethyl aluminum chloride (DEAC) activator.

In each example, 1-7, a 15×125 mm test tube, capped with an unextracted rubber stopper, is sparged with nitrogen for 10 minutes. 5 ml (38 mmol) DCPD is then added and the test tube sparged for an additional 10 minutes. A tantalum pentachloride catalyst is then added by syringe. After inserting a thermocouple, DEAC is added by syringe and each test tube is then shaken several times to mix the components. The particular tantalum pentachloride catalyst solution and the molar ratio of monomer to tantalum to DEAC is shown in Table 1. Each test tube is then placed in a water bath, heated to 60° C. For each sample, the mixture rapidly reacts to form a polymer which visual inspection shows has little color and good transparency. In each example the change in temperature of the combined solutions (ΔT) and the time until ½ exotherm (t½) was actually measured and is reported in Table 2. The exotherm is an indication of the rate and completeness of the polymerization. The quicker the time until the exotherm the quicker the reaction and the greater the exotherm the greater the degree of polymerization.

TABLE 2

| Example | Catalyst | DCPD:Ta:DEAC Molar Ratio | ΔT | t½ |
| --- | --- | --- | --- | --- |
| 1 | A | 2000:1:3 | 170° C. | 2 minutes |
| 2 | B | 8000:1:9 | 148° C. | 45 minutes |
| 3 | C | 2000:1:3 | 168° C. | 2.7 minutes |
| 4 | D | 2000:1:4 | 161° C. | 1 minute |
| 5 | E | 2000:1:3 | 163° C. | 1.5 minutes |
| 6 | F | 4000:1:6 | 156° C. | 1.8 minutes |
| 7 | G | 3000:1:4.5 | 169° C. | 1.4 minutes |

EXAMPLE 8

Example 8 illustrates a preferred embodiment of preparing a cross-linked copolymer of dicyclopentadiene and dimethanehexahydronaphthalene using a tantalum pentachloride catalyst and a diethyl aluminum chloride (DEAC) activator.

In Example 8, a 15×125 mm test tube, capped with an unextracted rubber stopper, is sparged with nitrogen for 10 minutes. 38 mmol DCPD and 3.8 mmol dimethanehexahydronaphthalene are then added and the test tube sparged for an additional 10 minutes. A methanol solubilized tantalum pentachloride catalyst, prepared as outlined in Example D, is then added by syringe. DEAC is added by syringe and the test tube shaken several times to mix the components. The molar ratio of combined monomers to tantalum to DEAC is 2000:1:4. The test tube is then placed in a water bath, heated to 60° C. The mixture reacts to form a polymer which visual inspection shows has little color and good transparency.

EXAMPLES 9 and 10

Examples 9 and 10 illustrate preferred embodiments of preparing a cross-linked copolymer of DCPD and dimethaneoctahydronaphthalene using a tantalum pentachloride catalyst and a diethyl aluminum chloride (DEAC) activator.

In each example, 9 and 10, a 15×125 mm test tube, capped with an unextracted rubber stopper, is sparged with nitrogen for 10 minutes. Into one test tube is added 34 mmol DCPD and 3.4 mmol dimethaneoctahydronaphthalene (Example 9). Into a second test tube is added 34 mmol DCPD and 6.8 mmol dimethaneoctahydronaphthalene (Example 10). The test tubes are then sparged for an additional 10 minutes. The tantalum pentachloride catalyst is then added by syringe. DEAC is added by syringe and each test tube is shaken several times to mix the components. In each case the molar ratio of combined monomers to tantalum to DEAC is 2000:1:4. Each test tube is then placed in a water bath, heated to 60° C. In each example, the mixtures react to form a polymer which visual inspection shows has little color and good transparency.

EXAMPLE 11

Example 11 illustrates a preferred embodiment of preparing a cross-linked copolymer of DCPD and norbornadiene using a tantalum pentachloride catalyst and a diethyl aluminum chloride (DEAC) activator.

In Example 11 a 15×125 mm test tube capped with an unextracted rubber stopper, is sparged with nitrogen for 10 minutes. 34 mmol DCPD and 3.4 mmol norbornadiene is then added and the test tube sparged for an additional 10 minutes. A tantalum pentachloride catalyst prepared as in Example F is then added by syringe. DEAC is added by syringe and the test tube shaken several times to mix the components. The molar ratio of monomer to tantalum to DEAC is 2000:1:3. The test tube is then placed in a water bath, heated to 60° C. The mixtures react to form a polymer which visual inspection shows has little color and good transparency.

EXAMPLE 12

Example 12 illustrates a preferred embodiment of preparing a cross-linked copolymer of DCPD and norbornene using a tantalum pentachloride catalyst and a diethyl aluminum chloride (DEAC) activator.

In Example 12 a 15×125 mm test tube, capped with an unextracted rubber stopper, is sparged with nitrogen for 10 minutes. 34 mmol DCPD and 3.4 mmol norbornene is then added and the test tube sparged for an additional 10 minutes. A tantalum pentachloride catalyst, prepared as in Example G, is then added by syringe. DEAC is added by syringe and the test tube shaken several times to mix the components. The molar ratio of combined monomers to tantalum to DEAC is 2000:1:4. Each test tube is then placed in a water bath, heated to 60° C. The mixtures react to form a polymer which visual inspection shows to have little color and good transparency.

EXAMPLE 13

Example 13 illustrates a preferred embodiment of preparing a cross-linked copolymer of DCPD and cyclopentene using a tantalum pentachloride catalyst, and a diethyl aluminum chloride (DEAC) activator.

In Example 13 a 15×125 mm test tube, capped with an unextracted rubber stopper, is sparged with nitrogen for 10 minutes. 34 mmol DCPD and 3.4 mmol cyclopentene are then added and the test tube sparged for an additional 10 minutes. A tantalum pentachloride catalyst, prepared as in Example G, is added by syringe. DEAC is added by syringe and each test tube is then shaken several times to mix the components. The molar ratio of combined monomers to tantalum to DEAC is 2000:1:4. The test tube is then placed in a water bath, heated to 60° C. The mixture reacts to form a polymer which visual inspection shows to have little color and good transparency.

EXAMPLE 14

This example illustrates a preferred embodiment of the synthesis of poly(DCPD) via reaction injection molding using a tantalum pentachloride catalyst and a diethyl aluminum chloride activator (DEAC).

Poly(DCPD) is made using a standard RIM machine manufactured by Accuratio Co. of Jeffersonville, Ind. Into two tanks each having a volume of 2 gallons is charged DCPD containing 6% by weight of a random styrene-butadiene rubber. The tanks are then closed and inerted with nitrogen. Sufficient $Et_2AlCl$ is transferred into one of the tanks to bring the $Et_2AlCl$ concentration to 0.0284 M. Next, to the other tank is added sufficient tantalum pentachloride catalyst, prepared as outlined in Example G, to provide a 0.0071 M concentration. All transfers are done in a way to preclude the entrance of oxygen or moisture into the system. The materials are then thoroughly blended in their respective tanks.

The components of the two tanks are combined by a standard impingement type RIM mixhead. The ratio of the activator/monomer solution mixed with catalyst/monomer solution is 1:1. The impingement mixing is accomplished by passing both the solutions through orifices 0.032" in diameter at a flow rate approximately 80 ml/sec. This required pumping pressure of approximately 1000 psi.

The resulting mixture flows directly into a mold heated between 40° C. and 80° C. The mold is made out of chrome plated aluminum. The mold has a flat cavity which forms a plaque sample 10"×10"×⅛" thick. A clamping force of 1.5 tons is used to keep the mold closed. A cross-linked polymer is formed.

Other features, advantages and specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

What I claim and desire to protect by Letters Patent is:

1. A method of making a cross-linked substantially transparent low haze polymer comprising combining a plurality of reactant streams to form a polymerization solution, one reactant stream containing an organo aluminum activator of a metathesis catalyst system; a second reactant stream containing a catalyst of said metathesis-catalyst system, where the catalyst of the metathesis-catalyst system is a pentavalent tantalum catalyst represented by the formula $Ta-Y_5$, where Y is selected from the group of halides; —O—R, where R is a hydrocarbyl containing from 1 to 10 carbon atoms; and —OOCR', where R' is a hydrocarbyl containing from 1 to 10 carbon atoms; and at least one reactant stream containing dicyclopentadiene under polymerization conditions said polymerization stream comprising cycloolefin monomer, said monomer being at least 80 percent by weight dicyclopentadiene, and then recovering the cross-linked substantially transparaent polymer having a percent haze of less than 25 percent.

2. A method in accordance with claim 1 wherein the catalyst is tantalum pentachloride.

3. A method in accordance with claim 1 which further comprises, at least one of the reactant streams containing a blowing agent.

4. A method in accordance with claim 2 which further comprises, at least one of the reactant streams containing a blowing agent.

5. A method in accordance with claim 1 which further comprises, at least one of the reactant streams containing an elastomer.

6. A method in accordance with claim 2 which further comprises, at least one of the reactant streams containing an elastomer.

7. A method in accordance with claim 3 which further comprises, at least one of the reactant streams containing an elastomer.

8. A method in accordance with claim 4 which further comprises, at least one of the reactant streams containing an elastomer.

9. A method of making a cross-linked substantially transparent low haze polymer comprising combining a plurality of reactant streams to form a polymerization solution, one reactant stream containing an organoaluminum halide activator of a metathesis catalyst system; a second reactant stream containing a catalyst of said metathesis-catalyst system, where the catalyst of the metathesis-catalyst system is a pentavalent tantalum catalyst represented by the formula Ta—$Y_5$, where Y is selected from the group of halides; —O—R, where R is a hydrocarbyl containing from 1 to 10 carbon atoms; and —OOCR', where the R' is a hydrocarbyl containing from 1 to 10 carbon atoms; at least one reactant stream containing dicyclopentadiene; said polymerization solution containing cycloolefin monomer, said monomer being at least 80 percent dicyclopentadiene and up to about 20 percent, based on the weight of dicyclopentadiene of said cycloolefin being selected from the group consisting of norbornene, norbornadiene, cyclopentene, dimethanehexahydronaphthalene and dimethaneoctahydronaphthalene, under polymerization conditions and then recovering the cross-linked substantially transparent low haze polymer having a percent haze of less than 25 percent.

10. A method in accordance with claim 9 wherein the catalyst is tantalum pentachloride.

11. A method in accordance with claim 9 which further comprises, at least one of the reactant streams containing a blowing agent.

12. A method in accordance with claim 10 which further comprises, at least one of the reactant streams containing a blowing agent.

13. A method in accordance with claim 9 which further comprises, at least one of the reactant streams containing an elastomer.

14. A method in accordance with claim 10 which further comprises, at least one of the reactant streams containing an elastomer.

15. A method in accordance with claim 11 which further comprises, at least one of the reactant streams containing an elastomer.

16. A method in accordance with claim 12 which further comprises, at least one of the reactant streams containing an elastomer.

17. The method of claim 1 wherein at least one reactant stream comprises a cyclcolefin where the cycloolefin contains from 5 to 12 carbon atoms.

18. A transparent polymer polymerization feed composition, consisting essentially of: at least 80 weight percent dicyclopentadiene and a catalyst, said catalyst consisting essentially of Ta$Y_5$, where Y is selected from the group of halides; —O—R, where R is a hydrocarbyl containing from 1 to 10 carbon atoms; and —OOCR', where R' is a hydrocarbyl containing from 1 to 10 carbon atoms.

19. The composition of claim 18 further comprising elastomer.

20. The composition of claim 18 further comprising blowing agent.

21. The composition of claim 18 further comprising solvent, said catalyst being soluble in said solvent.

* * * * *

UNITED STATES PATENT AND TRADEMARK OFFICE
CERTIFICATE OF CORRECTION

PATENT NO. : 4,703,068
DATED : October 27, 1987
INVENTOR(S) : Tuyen T. Nguyen 1-2

It is certified that error appears in the above-identified patent and that said Letters Patent is hereby corrected as shown below:

```
Column 3, line 67 "10,000:1, 1, preferably"

should read -- 10,000:1, preferably --

Column 7, line 5 "catalyst.lyst."

should read -- catalyst. --

Column 10, line 40 "transparaent"

should read -- transparent --
```

Signed and Sealed this

Twenty-second Day of March, 1988

*Attest:*

DONALD J. QUIGG

*Attesting Officer*  *Commissioner of Patents and Trademarks*